United States Patent [19]
Normand

[11] 4,397,539
[45] Aug. 9, 1983

[54] APPARATUS FOR CONSTITUTING A ROTARY MAGNETIC BRUSH

[75] Inventor: Gerard Normand, Besancon, France

[73] Assignee: Societe Anonyme dite Compagnie Industrielle Des Telecommunications Cit-Alcatel, Paris, France

[21] Appl. No.: 333,505

[22] Filed: Dec. 22, 1981

[30] Foreign Application Priority Data

Dec. 23, 1980 [FR] France .................. 80 27346

[51] Int. Cl.³ .......................................... G03G 15/00
[52] U.S. Cl. .............................. 355/3 DD; 355/3 R; 355/14 D; 118/658
[58] Field of Search ................ 355/3 DD, 3 R, 14 D, 355/14 R; 118/658

[56] References Cited

U.S. PATENT DOCUMENTS

| | | | |
|---|---|---|---|
| 3,800,175 | 3/1974 | Plotscher et al. | 310/164 |
| 4,052,630 | 10/1977 | Inariba | 310/162 |
| 4,074,157 | 2/1978 | Lace | 310/67 R |
| 4,079,266 | 3/1978 | Vipond | 355/14 D |
| 4,260,239 | 4/1981 | Peperstraete et al. | 355/3 DD |
| 4,330,198 | 5/1982 | Matsumoto et al. | 355/14 D |
| 4,371,257 | 2/1983 | Nishikawa et al. | 355/14 D |

Primary Examiner—A. C. Prescott
Attorney, Agent, or Firm—Sughrue, Mion, Zinn, Macpeak and Seas

[57] ABSTRACT

An apparatus for constituting a rotary magnetic brush comprises a hollow cylindrical member (11) with permanent magnetic strips arranged axially along its periphery. The strips have outwardly directed magnetic poles in a configuration in which north poles and south poles alternate circumferentially. A tube (13) made of non-magnetic substance surrounds said member without touching it. The tube is intended to have particles of magnetic powder deposited on its surface and the particles are made to rotate by rotating the member (4). This causes a rotating layer or "brush" of magnetic particles to be formed on said tube. Said member (11) and the tube (13) which surrounds it are longer than the "brush": An end portion projects beyond the "brush" and is housed in an electrical stator (14) which drives the member (11) by making use of the poles which form the brush. The invention applies to developing electrostatic latent images.

5 Claims, 4 Drawing Figures

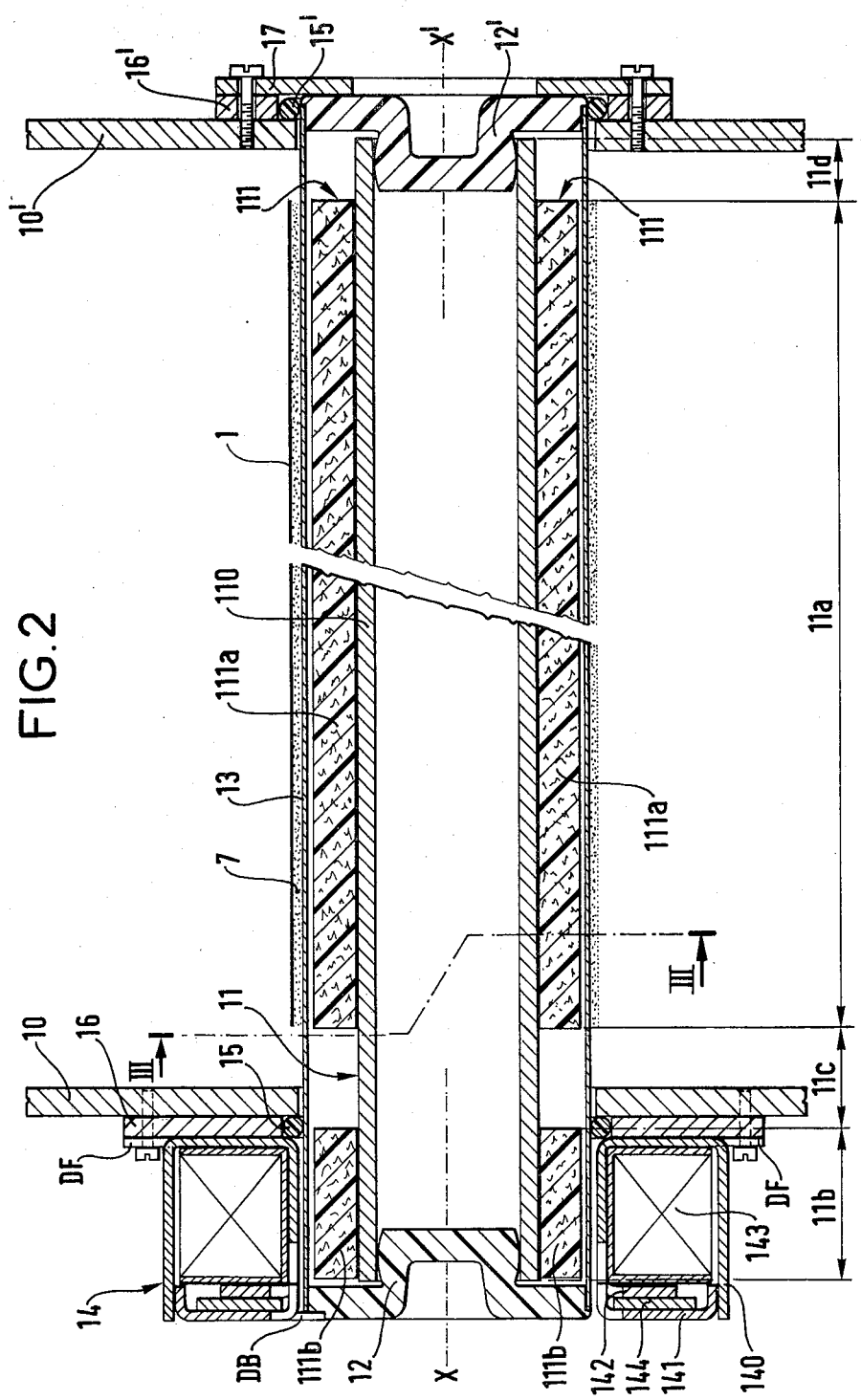

APPARATUS FOR CONSTITUTING A ROTARY MAGNETIC BRUSH

The invention relates to apparatus for constituting a rotary magnetic brush. It applies in particular to developing an electrostatic latent image in an electrostatic or electrophotographic printer, and in particular for document reproduction apparatus such as a duplicator or a teleduplicator.

BACKGROUND OF THE INVENTION

In an electrostatic or electrophotographic printer of a document reproduction apparatus, documents are generally reproduced by using data derived from analysis of such a document to form an electrostatic image thereof on a support by means of an electrostatic or electrophotographic printing method depending on the type of printer, by developing said latent image by means of a development substance and fixing the developed latent image directly on said support or transferring the image onto another support (e.g. paper) and fixing thereon the image which has been developed and transferred.

In numerous printers of these types, the latent image is developed in what is currently called a developer unit by bringing coloured (e.g. black) particles of a powder developer substance close to the support of the latent image to be developed so that electrostatic forces due to the charges forming the latent image attract the developer particles towards the support and hold them on its surface at those places where the charge of the image is located, thereby making the latent image visible.

Developer methods currently used and known under the name of the "magnetic brush" method such as the method described in U.S. Pat. No. 2,786,439 use a powdered developer substance made of magnetic particles. The developer substance can be of the two component type in which case it is constituted by a mixture of fine coloured non-magnetic particles and larger magnetic particles-usually iron particles. Alternatively, said substance can be of the single component type in which case it is constituted by coloured particles which contain a magnetic compound such as, for example, magnetite. In accordance with a known method, described in U.S. Pat. No. 4,155,328, under the effect of magnetic drive forces, a particular configuration which is reminiscent of that of a rotary brush is imparted to the developer powder which is drawn e.g. from a tank. The support of the latent image moves past the "brush" thus formed which extends over the entire width of the support in a direction perpendicular to support movement whereby the entire surface of the support is swept by the "brush" which then leaves coloured particles of developer powder where the charges are located, said magnetically formed or magnetic "brush" being constantly regenerated to compensate for the loss of particles.

In accordance with said U.S. Pat. No. 4,155,328, a developer unit is known which uses such a method and a single component type development substance. In said developer unit the apparatus used to constitute the magnetic "brush" has a solid bar with a longitudinal axis of symmetry, said bar being assembled so as to rotate about said axis and bearing permanent magnets on its periphery. A cylindrical aluminium tube surrounds the bar fitted with the magnets, and a motor assembled in the developer unit in a stationary configuration rotates the bar by means of a coupling between the motor and the bar. The magnets each extend parallel to the axis along the entire bar except for the ends thereof which are thinner than the rest of the bar. These ends are mounted in two bearings and one of them is connected to the motor by the coupling means. The magnets are disposed uniformly around the periphery of the bar and are arranged so as to each have at its end nearest the tube a pole of a type different to that of the two magnets on either side of it.

A tank supplies the tube with powdered developer and under the effect of these magnets which rotate as one piece with the bar the developer substance forms a layer of particles around the tube which layer rotates in the opposite direction to the bar and constitutes said "brush" whose length is substantially the same as that of the magnets.

The present invention aims to allow a lighter, more compact and cheaper apparatus to be produced to form such a "brush".

SUMMARY OF THE INVENTION

The invention provides an apparatus for constituting a rotary magnetic brush, said apparatus comprising a generally cylindrical member having a longitudinal axis of symmetry and installed so as to rotate about said axis and on whose periphery longitudinally extending magnetic poles are installed to extend parallel to the axis in a uniformly spaced out configuration with alternating outwardly-directed north and south poles, a tube made of a non-magnetic substance surrounding said member without touching it and intended to have its surface covered along at least a part of its length with particles of magnetic powder, and drive means for making said member rotate inside said tube with a view to forming a rotating layer of particles of said magnetic powder on the surface of the tube, the rotation being obtained by the effect of said magnetic poles rotating inside said tube, said rotating layer of magnetic particles constituting said magnetic brush, wherein said member extends beyond the brush-forming region on which the magnetic particles rotate and has an end drive portion intended not to be covered with said layer of magnetic particles, said magnetic poles extending over said drive portion which co-operates with an electromagnetic stator having a cylindrical surface delimited by magnetic poles arranged so as to cause said member to be driven in rotation by co-operation between the poles of the electromagnetic stator and the poles of said member in said drive portion, thereby constituting said drive means.

Preferably, said member is hollow.

Also preferably, said tube surrounds said member over its entire length, said tube extending between the poles of said member and the poles of the stator at said drive portion of the member.

Preferably, the stator is annular.

BRIEF DESCRIPTION OF THE DRAWINGS

The features and advantages of the present invention become more clearly apparent from the description given hereinafter with reference to the accompanying drawings in which:

FIG. 2 is a longitudinal cross-section of an apparatus in accordance with the invention used in the preceding developer unit;

MORE DETAILED DESCRIPTION

Figure 1:
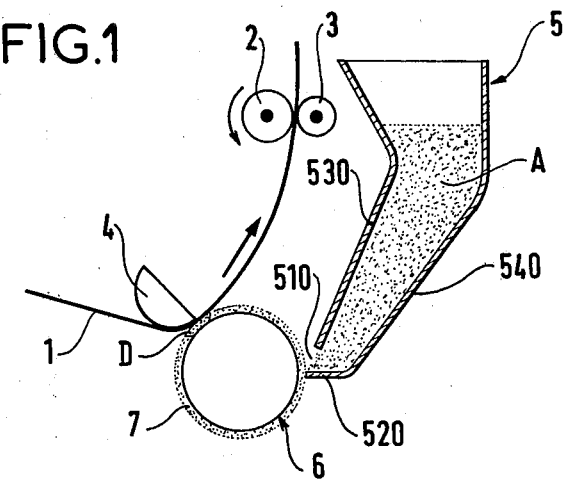
FIG. 1 illustrates schematically a unit of the magnetic "brush" type for developing an electrostatic latent image, associated with an image support.

Electrostatic latent images are applied to a support 1 such as strip of a dielectric paper, i.e. paper with an electrically conductive substrate covered with a thin dielectric layer. The latent images are formed on the dielectric layer and they are developed in a developer unit shown in FIG. 1. The latent image bearing dielectric layer of the paper strip 1 runs through a so-called developer zone D which extends lengthwise across the whole width of the strip and in which the latent image is developed. The paper is driven stepwise by a drive roller 2 associated with a driven roller 3, with the paper strip being engaged between the two rollers 2 and 3 at a point downstream from the developer zone in the direction of paper run. The paper is held adjacent to the developer zone D by a fixed half-cylinder shaped component 4. Of course, in between the developer zone D and the pair of rollers 2 and 3, the strip of paper 1 passes through a unit for fixing the developed image, which unit is neither shown nor described here since it is not directly related to the present invention.

The components in FIG. 1 are schematically illustrated in a cross-section view in a vertical plane perpendicular to the horizontal axes of rotation of the rollers 2 and 3.

The developer unit includes a tank 5 containing an image developer powder referenced A consisting of magnetic particles of the single-component type. The tank 5 is made of a non-magnetic substance and its length is very slightly greater than the width of the strip of paper. The tank is filled from the top and at its bottom there is a slot 510 through which the image developer powder A passes. The length of the slot 510 is substantially equal to the width of the paper and extends lengthwise parallel to the axes of rotation axes of the rollers 2 and 3. As illustrated, the tank 5 has, for example, a flat bottom referenced 520 and the slot 510 is provided between the bottom 520 of the tank and an upwardly sloping longitudinal wall 530 of the tank. In other words the bottom 520 and the wall 530 are not contiguous. The other longitudinal wall of the tank, which may be integral with the bottom 520 is referenced 540.

The tank 5 feeds developer powder A via the slot 510 onto a brush-forming device 6 in the developer station, on which device a rotating brush 7 of magnetic developer particles is formed. On receiving the powder from the tank 5, the brush-forming device 6 causes the powder to rotate about a cylindrical surface lying parallel to the rollers 2 and 3 by rotating magnetic forces set up by the device 6. This has the effect of producing said rotating brush 7 in the form of a kind of rotating sleeve of powder whose length is substantially equal to the length of the slot 510, i.e. to the width of the strip of paper 1. The brush 7 sweeps the surface of the dielectric layer of the strip of paper 1 where it passes through developer zone D, in other words the developer zone is constituted by the portion of the brush 7 which comes into contact with the paper.

While sweeping past the paper, the brush 7 leaves particles of image developer powder A on the paper at points where latent image forming electric charges are located. The latent image is thus made visible due to the fact that when these particles become charged with a polarity which is opposite to that of the image-forming charges (e.g. the effect of turbulence in the layer 7), they are attracted towards and held at said points since the electrostatic forces and are locally stronger than the magnetic forces generated by the device 6. The quantity of developer powder lost by the brush 7 in the development zone D is compensated by the powder supplied to it by the tank 5, and mechanical adjustment means (not illustrated) may be provided to compensate the quantity of developer powder lost by the brush 7, substantially exactly, thereby improving the quality of the developed image. The amount of powder lost is naturally a function of charge density in the latent image.

The brush-forming device 6 is not illustrated in detail in FIG. 1 but is simply shown symbolically as a cylinder whose side surface constitutes the cylindrical surface around which the brush 7 is formed and rotates.

Figure 3:
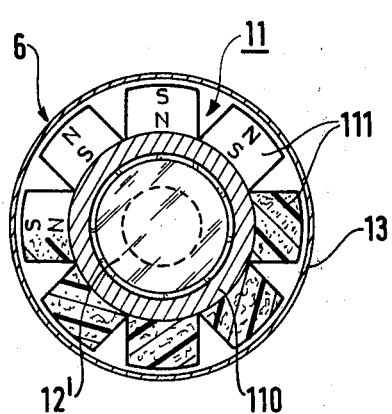
FIG. 3 is a partial cross-section along a broken line III—III of FIG. 2 of the apparatus in accordance with the invention.
Figure 4:
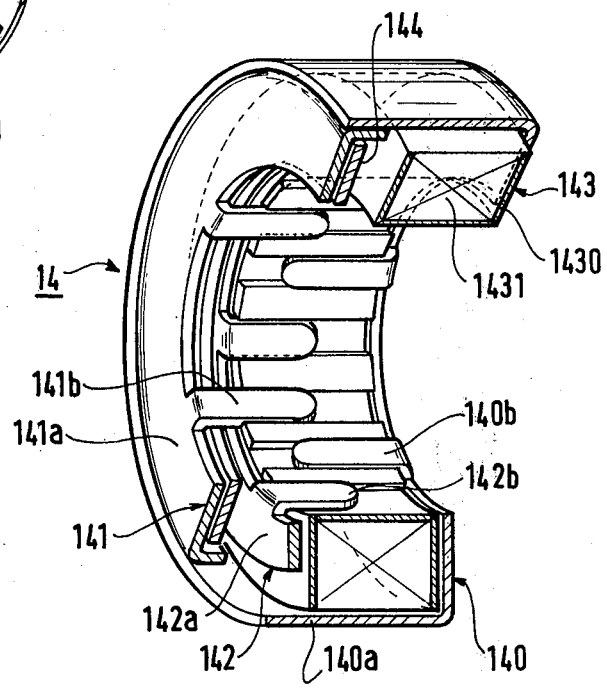
FIG. 4 is a partially cut away perspective view of another component of the apparatus in accordance with the invention illustrated in FIG. 2.

The brush-forming device 6 produced in accordance with the invention is illustrated in FIGS. 2 to 4. FIG. 2 is a longitudinal section through the device 6 installed in said developer unit, showing end plates 10 and 10' of the developer unit, between which the tank 5 (not shown in FIG. 2) extends. The section plane of FIG. 2 passes through the developer zone D, showing the strip of paper 1 being swept by the magnetic brush 7 which said device 6 produces. FIGS. 3 and 4 show two respective portions of said device 6 which is described below with reference to FIGS. 2 to 4.

The device 6 has a generally cylindrical member 11 about an axis XX' of longitudinal symmetry and with permanent magnetic poles-eight in the example illustrated—distributed around its periphery. These poles extend parallel to the axis XX' and are uniformly spaced out with north and south poles being disposed in an alternating configuration around the periphery of said member which is a shown in cross-section in FIG. 3. The member 11 is longer than the width of the strip of paper 1 and is constituted by a hollow cylindrical steel bar 110 of circular cross-section about the axis XX' with magnetic elastomer strips 111—eight in the present case—stuck to the outer surface of the hollow bar 110. The strips 111 extend parallel to the axis XX' and are disposed uniformly around the periphery of the bar 110 in such a manner that each strip 111 has an outwardly directed magnetic pole (north or south) and that each outwardly direct pole is of opposite polarity to the outwardly directed poles of the neighbouring strips on either side thereof. Said outwardly directed poles of the strips 111 constitute the said poles of the aforementioned member 11.

Advantageously, there is a discontinuity in the strips 11 at a first annular strip-free portion of the bar 110 (this discontinuity being provided simply by cutting away a portion of each strip whereby each strip is in two portions. A first one of said portions, referenced 111a, is substantially as long as the width of the strip of paper 1 and extends from one side of said first annular portion to a point which is a short distance away from one end of the bar 110 which thus ends in a second annular strip-free portion. The other one of said magnetic strip portions, referenced 111b, is very much shorter than the first portion and extends from the other side of said first annular strip-free portion of the bar 110 substantially up to the other end of the bar. The longitudinal portions of the member 11 on which the portions 111a and 111b of the strips 111 extend are referenced 11a and 11b respectively, and the annular strip-free portions of the member 11 are referenced 11c and 11d, where 11d is the end one of said strip-free portions.

Except in its two annular strip-free portions 11c and 11d, the member 11 is of uniform cross-section all along its length.

The hollow member 11 is mounted on two male type bearings 12 and 12' (made for example of polyamid) so that it can rotate about the axis XX'. The bearing 12 is located at the end nearest the portion 11b and the bearing 12' is located on the end nearest the portion 11d.

A cylindrical tube 13 surrounds the member 11 without coming into contact therewith and it lies coaxially thereto. Said tube is made of a non-magnetic substance, e.g. aluminium, its wall is very thin, and its inside diameter is not much greater than the outside diameter of the hollow bar 110 plus the thickness of the strips 111. It covers the member 11 along the whole length thereof and is fixed e.g. by glueing to the bearings 12 and 12' which also serve as end plates for the device 6.

The end plates 10 and 10' have respective circular openings through which the tube 13 passes. The tube 13 is slightly longer than the member 11 and extends from just outside the end plate 10', through the space between the end plates, to projet beyond the end plate 10. Inside the tube 13, the member 11 extends over nearly the same distance with its strip-free annular portions 11d and 11c being located in the vicinity of the end plates, its elongated strip portion 11a extending over most of the distance between the end plates, and its shorter strip portion 11b projecting beyond the end plate 10.

The magnetic brush 7 composed of image development powder supplied by the tank 5 (FIG. 1) is formed as set forth hereinafter around the tube 13 over the portion 11a of the member 11.

An annular shaped electromagnetic stator 14 is installed round the portion 11b of the member 11 surrounded by its cylindrical tube 13. That is to say, the stator 14 is installed around the portion of the member 11 which projects as described above beyond the end plate 10. The stator 14 is connected to an AC electricity supply not illustrated. Its function is to make the member 11 rotate inside the tube 13 about the axis XX'.

The stator 14 is a single-phase stator and has a magnetic circuit formed by three components referenced 140, 141 and 142 (referred to hereinafter as the yoke 140, the yoke plate 141 and the auxiliary yoke plate 142 respectively), an excitation winding 143 and a phase shifter ring 144.

A more detailed description of the stator 14 is given hereinafter with reference more particularly to FIG. 4.

The yoke 140 and the yoke plate 141 are formed mainly by two portions 140a and 141a respectively which have circular symmetry each having a tubular portion and an inwardly directed annular portion, i.e. each of the portions 140a and 141a has a substantially L-shaped cross-section with a slightly rounded angle. The yoke 140 and the yoke plate 141 also include flat tabs 140b and 141b which, as becomes apparent from the following description, form a first set of stator poles and a second set of stator poles respectively and are therefore referred to as pole parts. The portion 140a fits into the portion 141a so as to form an assembly which is ring-shaped with a substantially U-shaped axial cross-section with the U open towards the inside of this assembly. The base of the L of the cross-section of the yoke plate 141 lines the inside of an end portion of the body of the L-shaped cross-section of the yoke 140. By means of short fixing lengths which are not referenced the pole tabs 140b and 141b are connected to the portions 140a and 141a respectively and project inwardly therefrom to form an interdigitated set of pole pieces arranged around the axis XX'. The short fixing lengths are bent substantially at 90° to the flanges of the U-shaped cross-section of said assembly and partially close the U. The pole tabs of each assembly thus extend in a uniformly spaced out configuration around a cylindrical surface with a diameter d which is smaller than the inside diameter of the edges of the flanges of the assembly 140, 141 but very slightly larger than the outside diameter of the tube 13. The tabs 140b are identical to one another, as are the tabs 141b, and in the example in question, there are four of each kind of tab, two tabs 140b and two tabs 141b only being illustrated in FIG. 4.

The auxiliary yoke plate 142 is mainly formed by a flat annular portion 140a with four identical flat tabs 142b (only two visible in FIG. 4) which, as apparent hereinafter, form a third set of poles of the stator and are therefore also referred to as pole parts. Said flat annular portion 142a is disposed under the annular portion of the portion 142a of the yoke plate 142 and is separated from it by the phase shifer ring 144, the portion 142a being substantially narrower than the annular portion of the portion 141a but of substantially the same inside diameter. The pole tabs 142a are each connected to the inside circular edge of the annular portion 142a by a short fixing length which is not referenced and is identical from one pole tab 142b to another, thus allowing the tabs 142b to be at 90° from the flat portion 142a. These pole tabs are also uniformly spaced out around the said cylindrical surface of diameter d, being interdigitated between the other two sets of pole tabs.

The yoke 140, the yoke plate 141 and the auxiliary yoke plate 142 which are made for example of soft steel are here each of constant thickness and all three have the same thickness.

The phase shifter ring 144 is made of a non-magnetic electrically conductive substance such as, for example, aluminium or copper, and is in the form of a ring whose inside diameter is slightly larger than the diameter d increased by the thickness of the pole tabs and whose outside diameter is slightly smaller than the inside diameter of the tubular portion of the portion 141a of the yoke plate.

The excitation winding 143 is constituted firstly by an insulating housing 1430 which has substantially the shape of a hollow ring of rectangular cross-section installed inside the assembly formed by the portions 140a and 141a of the yoke and of the yoke plate respectively and secondly by a winding 1431 housed inside said hollow ring. The annular housing 1430 has axial ribs on the outside of its inner cylindrical wall. The pole tabs 140b, 141b and 142b respectively are inserted between these axial ribs and the sum of the widths of the pole tabs does not exceed $\pi d$.

The various components of the stator 14 are therefore assembled in such a way that the winding 143 is trapped in a sort of annular cage delimited by the annular portions of the portions 140a and 141a of the yoke 140 and the yoke plate 141 respectively, by the cylindrical portion of the portion 140a of the yoke 140 and lastly by an inside openwork side wall formed by the pole tabs 140b, 141b and 142b. The cylindrical portion of the portion 141a of the yoke plate 141, the flat annular portion 142a of the auxiliary yoke plate 142 and the phase-shifter 144 in contact with the portion 142a are thus all housed inside said annular cage.

Of course, the housing 1430 and, for example, the portion 140a of the yoke 140 are provided with orifices (not illustrated) to pass supply leads between the aforementioned AC source and the winding.

In this assembly, the tabs of the yoke, of the yoke plate and of the auxiliary yoke plate which are interdigitated relative to one another delimit a cylindrical bore with a diameter d and a central axis which coincides with that of the winding 143 and that of the phase shifter ring 144, the spaces between the tabs around the circumference of the bore are occupied by the winding ribs and are of constant, small width. It will be observed that these ribs serve not only to correct the relative positioning of the components of the magnetic circuit of the stator 14 but also to hold these various components which are force fitted together.

The pole tabs 140b and 141b extend over approximately two thirds of the axial length of the winding, while the pole tabs 142b only extend over about one half of said length.

For the sake of convenient illustration, these tabs are shown in FIG. 4 to be of the same width. Advantageously, in practice, the tabs 142b are narrower than the tabs 141b which are themselves narrower than the tabs 140b. Thus, the pole tabs 140b have a surface area which is approximately equal to the sum of the area of the pole tabs 141b plus the area of the pole tabs 142b. The tabs 140b form a first set of main poles of the stator 14, while the pole tabs 141b and 142b (which extend axially in the opposite direction to the pole tabs 140b) form respectively a second set of main poles and a set of auxiliary poles associated with the second set of main poles. When the stator is energized, there is a small phase difference between the magnetic flux in the second set of main poles and the magnetic flux in the auxiliary poles because of the phase shifter ring 144, while at the same time there is a phase difference of about 180° between the magnetic flux in first set of main poles and the magnetic flux in the other two sets of poles.

As stated hereinbefore, the stator 14 is installed around the portion 11b of the member 11 which portion is housed substantially inside the bore delimited by the pole tabs. The cylindrical tube 13 made of non-magnetic substance extends inside said bore between the poles of the stator 14 and the poles of the member 11.

The yoke 140 of the stator 14 is applied against an O ring 15 friction fitted onto the tube 13 and itself applied against the outside surface of the end plate 10, while a spacer plate 16 surrounds said O ring. To fix the stator 14 on the end plate 10, said yoke is provided with fixing fingers DF (illustrated only in FIG. 2 where two fingers DF are shown). These fingers extend radially outwards from the flat annular portion of the portion 140a, with the stator being fixed by a screw passing through each finger DF and the spacer plate 16 and engaging the end plate 10. This arrangement serves not only to fasten the stator 14 to the end plate 10, but also to fasten one end of the tube 13 and hence the bearing 12 and the member 11. The other end of the tube 13 and the member 11 is fastened to the end plate 10' by a similar arrangement comprising an O ring 15' friction fitted on the tube 13, and applied against the outside of the end plate 10', a spacer plate 16' which surrounds said O ring 15' and a retaining washer 17 held against the outside end of the assembly, including the bearing 12' by means of screws which pass through the spacer plate 16' and engage in the end plate 10'. Further, the yoke plate 141 of the stator 14 is provided with stop fingers DB (illustrated only in FIG. 2 where in actual fact only one finger is shown). These fingers extend radially towards the axis XX' from the flat portion of the portion 141a and are inserted in notches provided for them in the bearing 12 which is thus prevented from moving axially in the direction X'X (the bearing being prevented from moving axially in the opposite direction XX' by the washer 17).

In operation, the stator 14 is supplied with AC to cause the member 11 to rotate by making the stator poles co-operate with the poles of the member 11 as they extend along the portion 11b thereof. The phase shifter ring 144 slightly shifts the magnetic flux in the main poles of the second set of main poles of the stator 14 relative to the magnetic flux in the auxiliary poles of said stator to enable self-starting of the brush-forming device 6 which starts asynchronously and subsequently settles down to operate synchronously. The member 11 is then rotating about the axis XX' at a speed of f/4 in the example considered where f is the frequency of the AC supply to the stator. It will be observed that the direction of rotation of the member 11 is determined by the order in which the main poles of the second set and the auxiliary poles are arranged between the main poles of the first set.

Image developer powder is deposited on the tube 13 which is disposed along the slot 510 in the tank 5 (FIG. 1) over the portion 11a of the member 11 and at a very short distance from said slot. Under the effect of the permanent magnetic poles of the member 11 which is rotating about the axis XX' inside the tube due to the stator 14, said image developer powder forms a layer or sleeve of particles along the portion 11a of the tube's surface, said layer or sleeve rotating in the opposite direction to that in which the member 11 is rotating and constituting the rotary magnetic brush 7 which sweeps the strip 1 where it passes close to the tube 13. It will be observed that the outside surface of the tube 13 over the portion 11a of the part 11 constitutes the cylindrical surface mentioned hereinbefore with reference to FIG. 1.

It will also be observed that the O rings 15 and 15' are provided not only to hold the tube 13, but also to provide proper sealing to remove the possibility of the image developer powder leaking outwards from the zone delimited by the end plates 10 and 10'. Such leakage is already limited in the example in question by the polefree portions of the member 11 on each side of its portion 11a which extends along the slot 510 in the tank 5 of image developer powder.

A particular embodiment of the invention is described but it is quite obvious that modifications can be made thereto and/or that some means can be replaced by other technically equivalent means. In particular and although it is less advantageous in practice, the permanent poles of the part housed inside the cylindrical tube could extend continuously along the whole length of this part; the cylindrical tube could optionally surround the permanent pole part only in the zone of the device 6 where the magnetic brush is intended to be formed. Further, the electromagnetic stator could be different from the one described. It could for example be of the magnetic circuit type with a stack of laminations and pole edges; in any case, it will be arranged so as to make the permanent pole member rotate by co-operation of its poles which delimit a cylindrical bore with those of said part on a longitudinal portion of said part intended to extend beyond the magnetic "brush" and housed in said bore.

Further, it is quite obvious that the invention is not limited to the particular example of application within whose scope it is described.

What is claimed is:

1. Apparatus for constituting a rotary magnetic brush, said apparatus comprising a generally cylindrical member having a longitudinal axis of symmetry and installed so as to rotate about said axis and on whose periphery longitudinally extending magnetic poles are installed to extend parallel to the axis in a uniformly spaced out configuration with alternating outwardly-directed north and south poles, a tube made of a non-magnetic substance surrounding said member without touching it and intended to have its surface covered along at least a part of its length with particles of magnetic powder, and drive means for making said member rotate inside said tube with a view to forming a rotating layer of particles of said magnetic powder on the surface of the tube, the rotation being obtained by the effect of said magnetic poles rotating inside said tube, said rotating layer of magnetic particles constituting said magnetic brush, wherein said member extends beyond the brush-forming region on which the magnetic particles rotate and has an end drive portion intended not to be covered with said layer of magnetic particles, said magnetic poles extending over said drive portion which co-operates with an electromagnetic stator being a cylindrical surface delimited by magnetic poles arranged so as to cause said member to be driven in rotation by co-operation between the poles of the electromagnetic stator and the poles of said member in said drive portion, thereby constituting said drive means.

2. Apparatus according to claim 1, wherein said member is hollow.

3. Apparatus according to claim 1, wherein said tube surrounds said member over its entire length, said tube extending between the poles of said member and the poles of the stator at said drive portion of the member.

4. Apparatus according to claim 1, wherein the stator is annular.

5. Apparatus according to claim 4, wherein said stator has an excitation winding a magnetic circuit made of three components assembled to form an annular cage in which the winding is trapped and a phase-shifter ring also housed in the cage, the electromagnetic poles being constituted by tabs which form a cylindrical openwork inside wall of the cage delimiting said cylindrical duct in which the drive portion of said member is housed, said tabs belonging to the three components of the magnetic circuit to form two sets of main poles and one set of auxiliary poles.

* * * * *